W. WEINBERG.
TESTER FOR ELECTRICAL DEVICES.
APPLICATION FILED SEPT. 20, 1920.
1,429,002.
Patented Sept. 12, 1922.
2 SHEETS—SHEET 1.
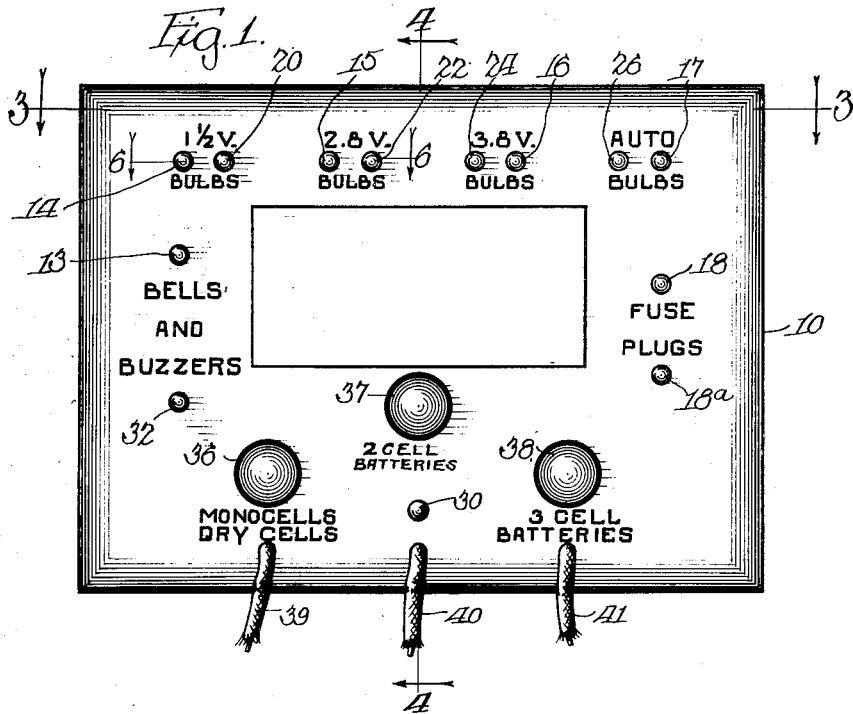
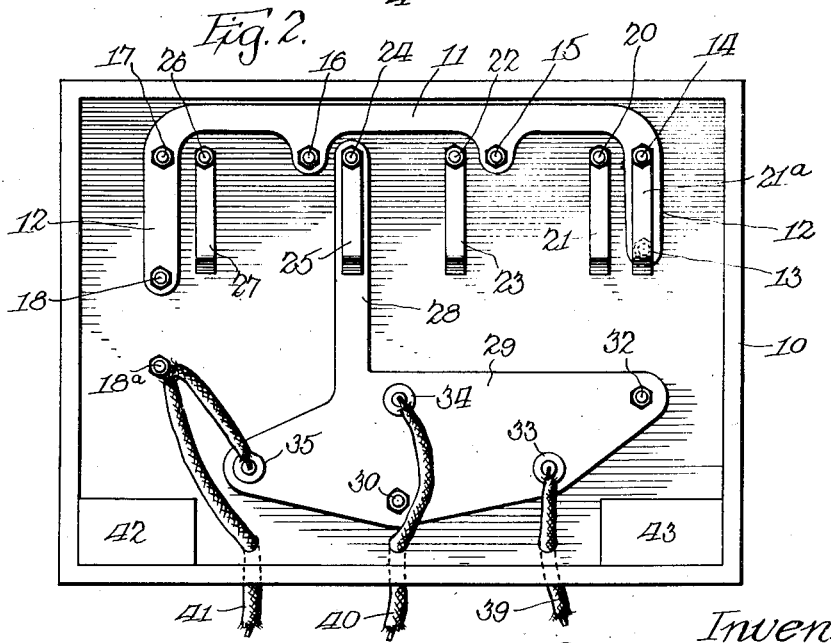

W. WEINBERG.
TESTER FOR ELECTRICAL DEVICES.
APPLICATION FILED SEPT. 20, 1920.
1,429,002.
Patented Sept. 12, 1922.
2 SHEETS—SHEET 2
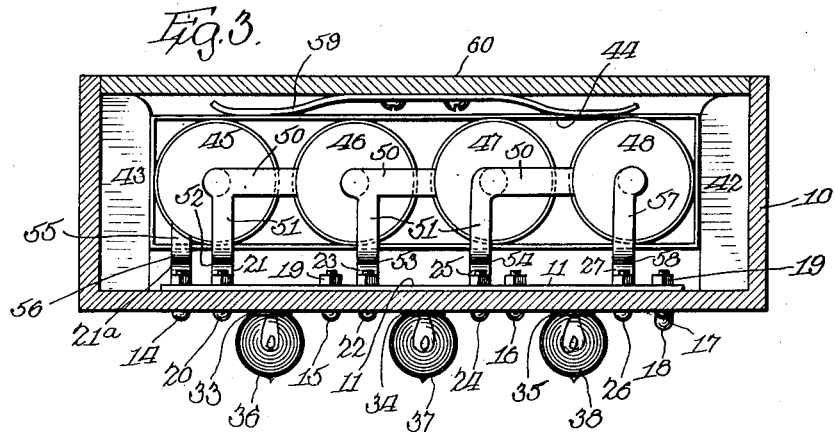
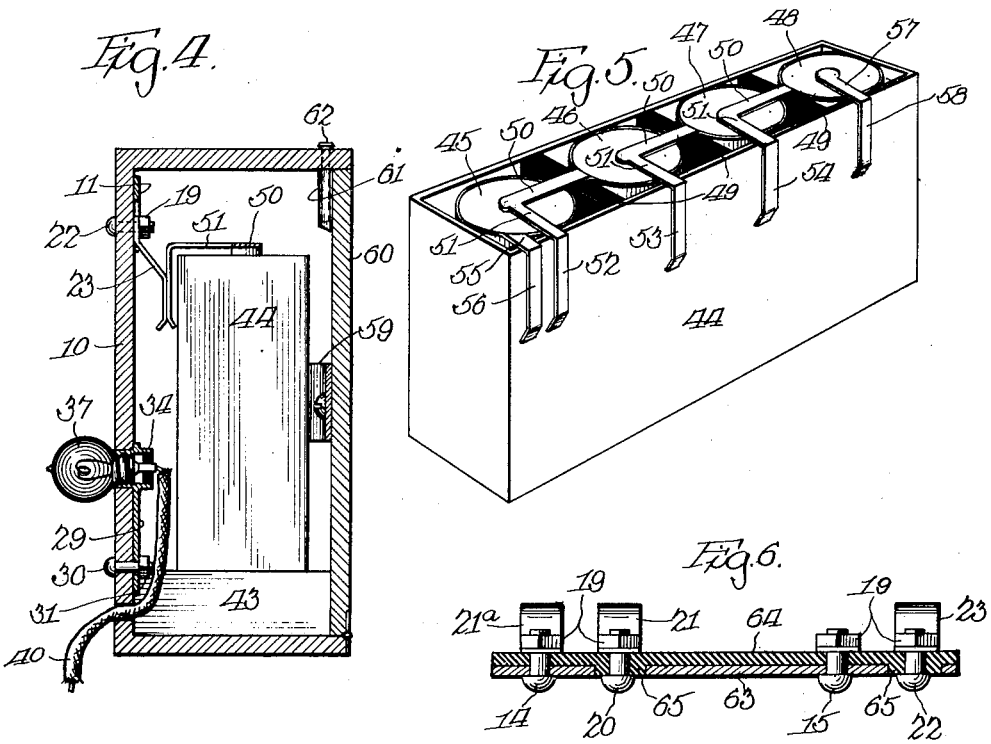
Inventor:
William Weinberg.
By Chas. A. Tillman
Atty.
Witness:

Patented Sept. 12, 1922.

1,429,002

UNITED STATES PATENT OFFICE.

WILLIAM WEINBERG, OF CHICAGO, ILLINOIS.

TESTER FOR ELECTRICAL DEVICES.

Application filed September 20, 1920. Serial No. 411,540.

*To all whom it may concern:*

Be it known that I, WILLIAM WEINBERG, a citizen of the United States, residing at Chicago, in the county of Cook and State of Illinois, have invented certain new and useful Improvements in a Tester for Electrical Devices, of which the following is a specification.

This invention relates to improvements in a tester or testing apparatus for various electrical devices, such as lamps, of various sizes for automobiles, flash-lights and the like, batteries, dry-cells, electric bells, buzzers and fuse plugs, and it consists in certain pecularities of the construction, novel arrangement, combination and operation of the various parts thereof as will be hereinafter more fully set forth and specifically claimed.

The principal object of the invention is to provide a convenient, handy, and if desired, portable tester or device to be used for ascertaining the efficiency of or testing numerous electrical articles or attachments, which device shall be simple and inexpensive in construction, strong, durable and efficient in operation, with its parts so made and arranged as to provide a self contained and operating unit.

Another object is to provide a tester of the above mentioned general character, which requires no switch or adjustment, but shall ever be ready for testing articles of the same class but of different voltage without danger or injury to said articles.

A further object is to furnish a tester whereby articles can be quickly and easily applied thereto for testing by simply placing certain parts of each article in contact with certain parts of the tester, thereby obviating the necessity of using ordinary receiving sockets for said articles and consequently saving the time and labor of inserting and removing the same.

Various other objects and advantages of the invention will be apparent from the following description and explanation.

In the accompanying drawings, which serve to illustrate an embodiment of the invention—

Fig. 1 is a front face view of the tester with its parts arranged ready for use and showing the casing thereof equipped with a number of bulbs or lamps for indicating the operative action of dry-cells and batteries. In this view the testing wires or conductors are shown as being broken off for the convenience of illustration.

Fig. 2 is an inner face view of the front wall of the casing showing the electric conductors supported thereby for co-action with the operating battery.

Fig. 3 is a plan sectional view taken on line 3—3 of Fig. 1 looking in the direction indicated by the arrows showing the operating battery in position within the casing but with the insulating members between the cells of said battery omitted for the sake of clearness and convenience of illustration.

Fig. 4 is a transverse sectional view taken on line 4—4 of Fig. 1 looking in the direction indicated by the arrows.

Fig. 5 is a detached perspective view of the operating battery showing means for connecting the cells thereof in series, and Fig. 6 is a horizontal sectional view taken on line 6—6 of Fig. 1 as indicated by the arrows and illustrating a modification in the construction of the casing of the device.

Corresponding numerals of reference refer to like parts throughout the different views of the drawings.

Referring now to Figs. 1 to 4 inclusive of the drawings, the casing, as an entirety, is designated by the reference numeral 10, and the said casing may be made of any suitable size, form and material, but in the present instance, is shown as being rectangular in shape and as being made of wood or other suitable non-electric-conducting material.

The front wall of the casing 10 has displayed on its outer surface near its upper edge and preferably in a horizontal line, the characters to wit: 1 1/2 v. 2.8 v. 3.8 v. Auto. These characters are arranged in spaced groups as shown and below each group of said characters and in a horizontal line on the front face of the front wall of the casing is displayed the word "Bulbs." The characters 1 1/2 v., 2.8 v., and 3.8 v.

are for the purpose of indicating approximately the voltage of the bulbs to be tested, so that a bulb of low voltage may not be applied to the contacts of the tester of a voltage of sufficient degree to injure the bulb when tested. The word "Auto" is for the purpose of indicating that the bulbs of automobile lamps are to be applied to the contact points located between the word "Auto" and the word "Bulbs" directly below the same.

Near one end of the casing 10 and on the front surface of the front wall thereof are displayed the words "Bells and buzzers" which words are located, by preference, one above the other as shown. Near the opposite end of the casing 10 on the front surface of the front wall thereof are displayed the words "Fuse plugs" which words are located one above the other as shown.

Secured to the inner surface of the front wall of the casing 10 and near its upper edge is a metal plate 11 or electric conductor which as shown in Fig. 2 of the drawings is of a substantially inverted U-shape, or in other words, has at each of its ends a downward extension 12. This conductor or plate by preference lies flat against the inner surface of the front wall of the casing and is held in such position by means of a series of screw-bolts or contact posts 13, 14, 15, 16, 17, and 18, which are extended through suitable openings in the front wall of the casing and suitable openings in said plate or conductor. A nut 19, is screwed on the inner portion of each of said bolts or contact posts for the purpose of securely clamping the plate 11 to the casing. As is clearly shown in Figs. 1 and 3 of the drawings, these bolts or posts project at their outer ends a slight distance from the front face of the casing 10 and in conjunction with their contact posts to be presently mentioned, provide contacts against which parts of the articles or devices to be tested may be easily, readily and accurately placed. Secured at one of its ends to the inner surface of the front wall of the casing 10 by means of a contact post 20, and a suitable nut 19 on the inner portion thereof is a spring contact arm 21 which depends from the last named post and is extended inwardly and free from the front wall of the casing. Secured to the inner surface of the front wall of the casing by means of a contact bolt or post 22 is one end of a spring contact arm 23 which also depends and is extended inwardly and free from said wall of the casing.

Secured at one of its ends to said wall of the casing by means of a contact bolt or post 24, is another spring contact arm 25 which is extended inwardly and free from the front wall of the casing and downwardly from its fixed point as is clearly shown in Fig. 2 of the drawings. Secured at one of its ends to the inner surface of the front wall of the casing by means of a bolt or contact post 26 is another spring contact arm 27 which depends from its fixed point and extends inwardly and free from the front wall of the casing.

By reference to Fig. 1 of the drawing, it will be seen that the posts 20, 22, 24, and 26 are located in the same horizontal line with the posts 14, 15, 16, and 17, and in pairs just above the words "Bulbs." The post 24 not only serves to secure the spring contact arm 25 to the front wall of the casing, but also acts as a securing means for the upper end of a conductor arm 28 of a metal plate 29, see Fig. 2, which is secured so as to lie flat against the inner surface of the front wall of the casing so that said plate will extend longitudinally thereof.

The post 14 not only serves to assist in securing the plate 11 to the front wall of the casing, but also acts as a securing means for the upper end of a spring arm 21ª which depends from its fixed point and extends inwardly and free from the front wall of the casing. The conductor plate 29 is secured to the front wall of the casing near the lower end thereof and about midway between its ends by means of a screw-bolt or contact post 30, and a nut 31 on the inner portion thereof. This post extends forwardly of the front face of the front wall of the casing as do all of the above named contact posts. That end of the conductor plate 29 adjacent the arm 21ª is connected or secured to the front wall of the casing by means of a contact post 32 which is located directly below the post 13 as is clearly shown in Figs. 1 and 2 of the drawings. The plate 29 carries three sockets 33, 34, and 35 adapted to receive lamp bulbs 36, 37, and 38, respectively, which bulbs are used as indicators in testing cells and batteries. The aforesaid sockets and lamp bulbs are of the ordinary or well known construction and require no further explanation, except, that said sockets are extended through suitable openings in the front wall of the casing as is clearly shown in Fig. 4 of the drawings in order that the bulbs may be readily connected to said sockets.

The sockets 33, 34, and 35, have leading therefrom and electrically connected thereto the testing wires or conductors 39, 40, and 41 respectively, each of which is extended through a suitable opening in the casing 10 and may be provided at its free end with a terminal (not shown) of any suitable construction.

Removably located in the casing 10 with its lower portion between a pair of blocks 42 and 43 located one each in the lower corners of the casing so as to prevent longitudinal movement thereof, is the operating battery of the tester, which comprises a container 44 of any suitable form and material, but by preference of an elongated rectangular shape and a series of cells 45, 46, 47, and 48, which may be of any suitable type. These cells are separated from one another by means of suitable insulating material 49 interposed therebetween as is clearly shown in Fig. 5 of the drawings.

These cells are connected in series by means of metallic strips 50 which lead from the positive pole of one cell to the negative pole of the other cell and each of said strips is provided with a laterally extended arm 51 which overlies the upper portion of the container 44 and terminates in downwardly extending spring members 52, 53, and 54, which are adapted when the battery is placed in operative position within the casing to contact with the arms 21, 23 and 25 respectively. The cell 45 has leading from its zinc element or negative pole a laterally extending arm 55 which terminates in a downwardly extended spring member 56 which arm and member are located outwardly of the container 44 as shown.

The member 56 is adapted to contact with the spring contact arm 21$^a$ and the cell 48 has leading from its carbon element or positive pole a laterally extended arm 57 which terminates in a downwardly extended spring member 58 adapted when the battery is placed in the casing to contact with the spring arm 27 as will be readily understood by reference to the drawings and particularly to Fig. 3 thereof.

The casing 44 of the operating battery is held in about the position shown in Fig. 3 of the drawings, by means of a horizontally disposed spring 59 mounted on the inner surface of the door 60 of the casing 10, which door is by preference hinged at its lower edge to the rear portion of the base of said casing and has at its upper portion a socket 61 to receive a bolt 62 for securing the door in closed position. By reference to Fig. 2 of the drawings, it will be seen that the testing wire or conductor 41 which leads from the socket 35 is electrically connected to a bolt or contact post 18$^a$ located in the front wall of the casing directly below the contact post 18 between which last named posts is displayed on the front surface of the front wall of the casing 10 the words "Fuse plugs," see Fig. 1 of the drawings.

In Fig. 6 of the drawings is shown a modification in the construction of the casing, which enables it to be made of metal, if desired, instead of wood or fiber as in the above described construction. In this modification the front wall 63 or the entire casing 10 is made of metal and has on its inner surface a sheet or piece of fiber 64 which is united to the front wall 63 by means of contact posts 14, 15, 20, 22, et cetera, in substantially the same manner and arrangement as the plate 11 is secured to the front wall above described. However, in this modification the posts 20, 22, 24, 18, 18$^a$, 32, and 26 are insulated from the metal wall 63 by means of apertured extensions 65 formed on the outer surface of the plate or piece 64 and located in suitable openings in the wall or plate 63 of the casing as is clearly shown in Fig. 6 of the drawings.

From the foregoing and by reference to the drawings, it will be readily understood and clearly seen that when it is desired to test bulbs of various kinds and voltage, all that is necessary is to place the plug of the bulb or lamp being tested properly in contact with a pair of the contact posts, for instance, the pair indicated by the numerals 14 and 20 in Fig. 1, when, if the lamp or bulb is in order, it will be illuminated. It is evident that care should be taken in applying the bulbs to a pair of contact posts of approximately the same voltage as that of the lamp or bulb, which voltage is approximately indicated above each pair of said posts in Fig. 1 of the drawings. To test bells and buzzers, it is only necessary to apply the posts of such devices to the pair of contact posts 13 and 32, when if the device is in order, a sound will be created. For testing fuse plugs, the contact posts 18 and 18$^a$ are employed by placing the poles of the plugs in contact therewith. The lamp 38 will then glow if the fuse plug is intact, and will not glow if the fuse plug is burned out. To test a mono-cell, one end of the same should be placed in contact with the post 30 while the terminal on the free end of the testing wire 39 should be placed in contact with the other end of said cell, which operation will cause the indicating lamp 36 to glow and thus show that the cell is efficient or in order. For testing two and three cell batteries, the same operation is performed, except that the testing wire 40 is used on a two cell battery, and the wire 41 is employed on a three cell battery. In the latter tests the indicating lamp 37 will be illuminated when the two cell battery is tested if the same is perfect, and if the three cell battery is perfect or in order, the indicating lamp 38 will be illuminated.

It is obvious that by my improvements a very compact, handy, and convenient tester is provided which is in a unitary or self contained form and does not rely on connection with a service line but is always ready for testing purposes. Furthermore, it is apparent that as contact posts are employed, time and labor in applying the devices to be tested to the same is reduced to a minimum.

Having thus fully described my invention, what I claim as new and desire to secure by Letters Patent is—

1. A testing apparatus of the character described, comprising a casing, a plurality of cells connected in series within said casing, a conductor plate secured to said casing, one of the terminals of the cells at one end of said series being provided with a spring finger to directly connect said conductor plate electrically therewith, and a plurality of pairs of contact posts, one of the posts of each pair being mounted on said conductor plate and the other posts of said pairs engaging with spring fingers electrically connected respectively with terminals of said cells having varying differences of potential between the same and said first mentioned terminal.

2. A testing apparatus of the character described, comprising a casing, a plurality of cells connected in series within said casing, a conductor plate secured to said casing, one of the terminals of the cells at one end of said series being provided with a spring finger to directly connect said conductor plate electrically therewith, and a plurality of pairs of contact posts, one of the posts of each pair being mounted on said conductor plate and the other posts of said pairs engaging with spring fingers electrically connected respectively with terminals of said cells having varying differences of potential between the same and said first mentioned terminal, one of said last mentioned contact posts being mounted on a second conductor plate, said second conductor plate being provided with a plurality of additional contact posts.

3. A testing apparatus of the character described, comprising a casing, a plurality of cells connected in series within said casing, a conductor plate secured to said casing, said conductor plate being electrically connected with one of the terminals of the cells at one end of said series, and a plurality of pairs of contact posts, one of the posts of each pair being mounted on said conductor plate and the other posts of said pairs being electrically connected respectively with terminals of said cells having varying differences of potential between the same and said first mentioned terminal, one of said last mentioned contact posts being mounted on a second conductor plate, said second conductor plate being provided with a plurality of additional contact posts, and a plurality of indicating lamps mounted on said second plate, said lamps having one of the terminals of each thereof electrically connected with said second plate and conductors leading out of said casing from the other terminals of said lamps.

4. A testing apparatus of the character described, comprising a casing, a battery of cells connected in series within said casing, a conductor plate secured to said casing, said conductor plate being electrically connected with one of the terminals of the cells at one extremity of said series, and a plurality of pairs of contact posts, one of the posts of each pair being mounted on said conductor plate and the other posts of said pairs being electrically connected respectively with terminals of said cells having graduated differences of potential between the same and said first mentioned terminal, said cells, said conductor plate and said contact posts being provided with co-operating spring contact fingers having beveled end portions, whereby said battery can be readily placed into position in and removed from said casing.

5. A testing apparatus of the character described, comprising a casing, a battery of cells connected in series within said casing, a conductor plate secured to said casing, said conductor plate being electrically connected with one of the terminals of the cell at one extremity of said series, and a plurality of pairs of contact posts, one of the posts of each pair being mounted on said conductor plate and the other posts of said pairs being electrically connected respectively with terminals of said cells having graduated differences of potential between the same and said first mentioned terminal, said cells, said conductor plate and said contact posts being provided with co-operating spring contact fingers having beveled end portions, whereby said battery can be readily placed into position in and removed from said casing, said casing being provided with a spring opposite said contact fingers to force said contact fingers into snug engagement.

6. A testing apparatus of the character described, comprising a casing, a battery of cells within said casing, substantially L-shaped connecting members connecting said cells in series, and terminating in downward spring contact fingers, a plurality of pairs of contact posts, one of the posts of each pair being provided with spring contact fingers co-operating with said first mentioned contact fingers, and spring means for forcing said contact fingers into engagement.

7. A testing apparatus of the character described, comprising a casing, a plurality of cells connected in series within said casing, a contact plate having a substantially straight body portion and depending end portions mounted on said casing, one of the terminals of said series of cells being electrically connected therewith, an elongated contact plate extending substantially parallel to said first mentioned plate mounted on said casing below said first mentioned plate, said plate having an upwardly extending leg terminating adjacent said first mentioned plate and electrically connected with said series of cells intermediate the ends thereof, a plurality of contact posts on said first mentioned plate, certain of said contact posts being mounted on said depending end portions, a contact post on said second plate co-operating with the contact post on one of said depending end portions, and a plurality of indicating lamps mounted on said second mentioned plate and having one of their terminals directly electrically connected therewith.

WILLIAM WEINBERG.